(12) United States Patent
Saito et al.

(10) Patent No.: US 11,270,845 B2
(45) Date of Patent: Mar. 8, 2022

(54) MULTILAYER CERAMIC CAPACITOR

(71) Applicant: Murata Manufacturing Co., Ltd., Nagaokakyo (JP)

(72) Inventors: Yuta Saito, Nagaokakyo (JP); Akito Mori, Nagaokakyo (JP); Takefumi Takahashi, Nagaokakyo (JP); Masahiro Wakashima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 73 days.

(21) Appl. No.: 16/988,754

(22) Filed: Aug. 10, 2020

(65) Prior Publication Data

US 2021/0098191 A1     Apr. 1, 2021

(30) Foreign Application Priority Data

Aug. 28, 2019   (JP) .............................. JP2019-155744

(51) Int. Cl.
*H01G 4/232* (2006.01)
*H01G 4/008* (2006.01)
*H01G 4/12* (2006.01)
*H01G 4/30* (2006.01)

(52) U.S. Cl.
CPC ............. *H01G 4/232* (2013.01); *H01G 4/008* (2013.01); *H01G 4/1227* (2013.01); *H01G 4/30* (2013.01)

(58) Field of Classification Search
CPC ........ H01G 4/30; H01G 4/012; H01G 4/1227; H01G 4/2325; H01G 4/1209; H01G 4/228; H01G 4/306; H01G 2/02; H01G 4/008; H01G 4/1218; H01G 4/232
See application file for complete search history.

(56) References Cited

U.S. PATENT DOCUMENTS

| 5,597,494 A * | 1/1997 | Kohno ..................... H01G 4/30 |
| | | 216/13 |
| 9,966,191 B2 * | 5/2018 | Noda ..................... H01G 4/232 |
| 2011/0110014 A1 * | 5/2011 | Hirata ................. C04B 35/4682 |
| | | 361/301.4 |
| 2012/0229952 A1 | 9/2012 | Kim |
| 2015/0022941 A1 * | 1/2015 | Cho ........................ H01G 4/30 |
| | | 361/301.4 |
| 2017/0018363 A1 * | 1/2017 | Tanaka ................... H01G 4/005 |
| 2019/0115153 A1 * | 4/2019 | Park ..................... H01G 4/1227 |

FOREIGN PATENT DOCUMENTS

| JP | 2006210590 A | * | 8/2006 | |
| JP | 2010021524 A | * | 1/2010 | .......... H01G 4/2325 |
| JP | 5654102 B2 | | 1/2015 | |

* cited by examiner

*Primary Examiner* — Michael P McFadden
(74) *Attorney, Agent, or Firm* — Keating & Bennett, LLP

(57) ABSTRACT

A multilayer ceramic capacitor includes a laminate including dielectric layers and internal electrode layers laminated together in a lamination direction, and a pair of external electrodes on both end surfaces of the laminate, the external electrodes being connected to the internal electrode layers, wherein a barrier is provided on a widthwise end of at least one internal electrode layer, the barrier having a thickness that decreases from the widthwise end of the internal electrode layer toward a side margin in a width direction, a void is defined by the widthwise end of the internal electrode layer, the barrier, and the side margin, and the barrier contains Ni and Sn.

20 Claims, 7 Drawing Sheets

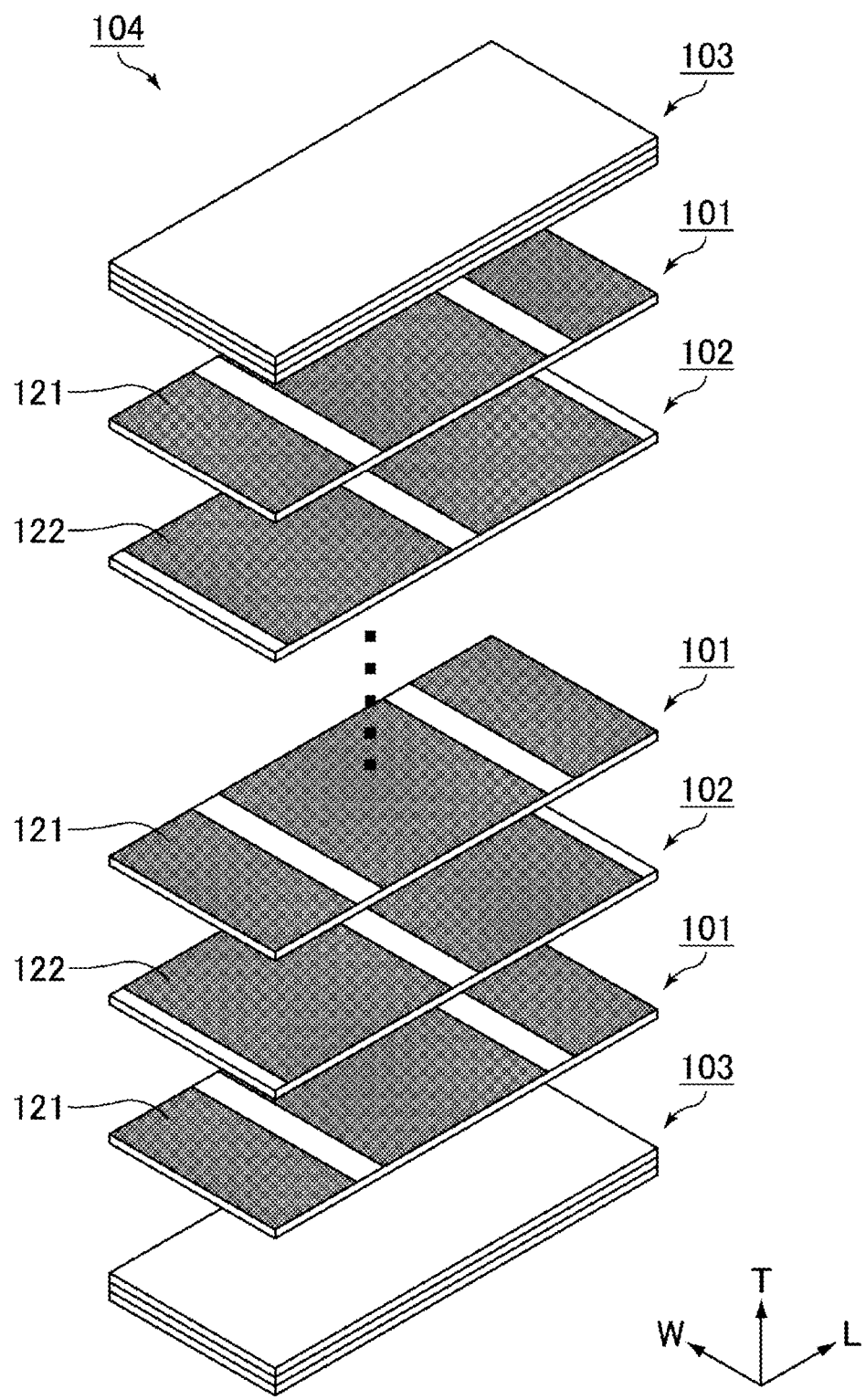

MULTILAYER CERAMIC CAPACITOR

CROSS REFERENCE TO RELATED APPLICATIONS

This application claims the benefit of priority to Japanese Patent Application No. 2019-155744 filed on Aug. 28, 2019. The entire contents of this application are hereby incorporated herein by reference.

BACKGROUND OF THE INVENTION

1. Field of the Invention

The present invention relates to a multilayer ceramic capacitor.

2. Description of the Related Art

A multilayer ceramic capacitor includes, for example, a laminate in which dielectric layers and internal electrode layers are alternately laminated and dielectric layers are further laminated on the top and bottom surfaces of the laminate, and a pair of external electrodes on both end surfaces of the laminate.

Generally, the multilayer ceramic capacitor can be produced by alternately stacking ceramic green sheets and raw internal electrode layers to produce a green chip, firing the green chip to obtain a laminate, and forming external electrodes on end surfaces of the laminate.

Small multilayer ceramic capacitors with high capacitances have been demanded in recent years. In order to provide such multilayer ceramic capacitors, it is effective to increase the effective area of the internal electrode layers on the ceramic green sheets, i.e., the area of the internal electrode layers that oppose each other.

Thus, there has been proposed a method of forming dielectric ceramic layers called side margins on side surfaces of the green chip. Specifically, ceramic green sheets each including raw internal electrode layers on a surface are laminated to produce a mother block, and the mother block is cut into green chips. The green chips are produced by cutting the mother block such that the internal electrode layers are exposed at the side surfaces on which the external electrodes are not formed. After cutting, the side margins are formed on the side surfaces of each green chip. This method can form the internal electrode layers over the entire width of the green chip, and thus can produce small multilayer ceramic capacitors with high capacitances.

JP 5654102 B, for example, discloses a method of forming side margins on side surfaces of a laminate body by applying a ceramic slurry with a sprayer or a roller or by dipping the laminate body in the ceramic slurry.

Firing the laminate body including the side margins tends to generate voids between the laminate body and the side margins, particularly between ends of the internal electrode layers and the side margins, due to the difference in shrinkage rate. Infiltration of water into the voids may reduce the insulation resistance between the dielectric layers and reduce the reliability of the resulting multilayer ceramic capacitor. The above problems are further exacerbated as the dielectric layers become thinner.

SUMMARY OF THE INVENTION

Preferred embodiments of the present invention provide highly reliable multilayer ceramic capacitors.

A multilayer ceramic capacitor according to a preferred embodiment of the present invention includes a laminate including multiple dielectric layers and multiple internal electrode layers laminated together in a lamination direction, a first main surface and a second main surface that oppose each other in the lamination direction, a first side surface and a second side surface that oppose each other in a width direction perpendicular or substantially perpendicular to the lamination direction, and a first end surface and a second end surface that oppose each other in a length direction perpendicular or substantially perpendicular to the lamination direction and the width direction; and a pair of external electrodes, one on the first end surface and the other on the second end surface, the external electrodes being connected to the internal electrode layers, wherein the laminate includes an inner layer portion where the internal electrode layers oppose each other with the dielectric layer therebetween, a first outer layer portion between the first main surface and the inner layer portion, a second outer layer portion between the second main surface and the inner layer portion, a first side margin between the first side surface and the inner layer portion, the first side margin extending between the first outer layer portion and the second outer layer portion, and a second side margin between the second side surface and the inner layer portion, the second side margin extending between the first outer layer portion and the second outer layer portion, a barrier is provided on a widthwise end of at least one internal electrode layer, the barrier having a thickness that decreases from the widthwise end of the internal electrode layer toward the first side margin or the second side margin in the width direction, a void is defined by the widthwise end of the at least one internal electrode layer, the barrier, and the first side margin or the second side margin, and the barrier contains Ni and Sn.

Preferred embodiments of the present invention provide highly reliable multilayer ceramic capacitors.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 10 is an exploded perspective view schematically showing an example mother block.

DETAILED DESCRIPTION OF THE PREFERRED EMBODIMENTS

Multilayer ceramic capacitors according to preferred embodiments of the present invention will be described below with reference to the drawings.

The present invention is not limited to the following preferred embodiments, and may be suitably modified without departing from the gist of the present invention. Combinations of two or more preferred features described in the following preferred embodiments are also within the scope of the present invention.

Multilayer Ceramic Capacitor

Figure 1:
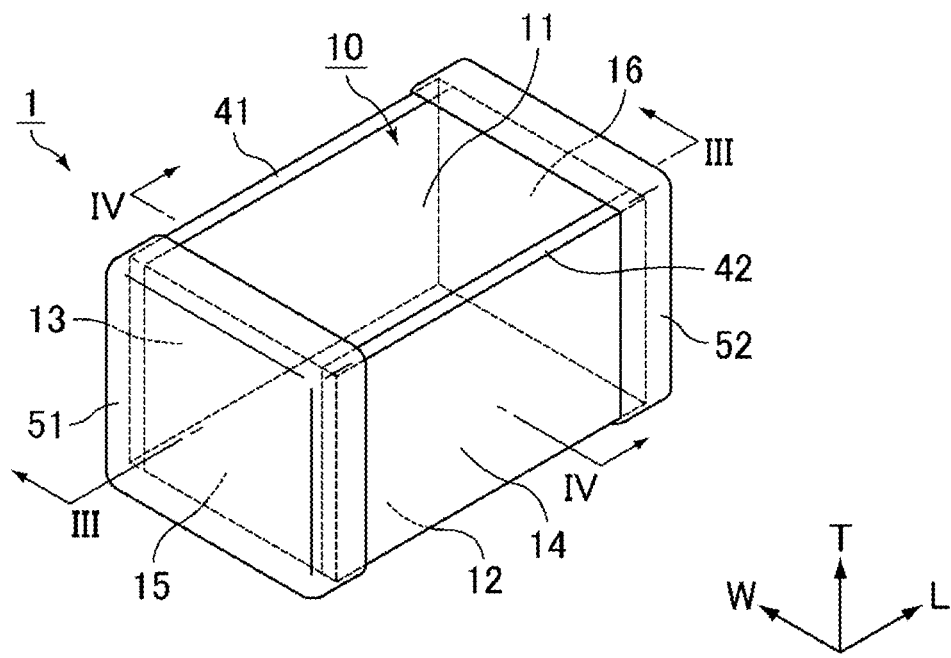
FIG. 1 is a perspective view schematically showing an example multilayer ceramic capacitor according to a preferred embodiment of the present invention.
Figure 2:
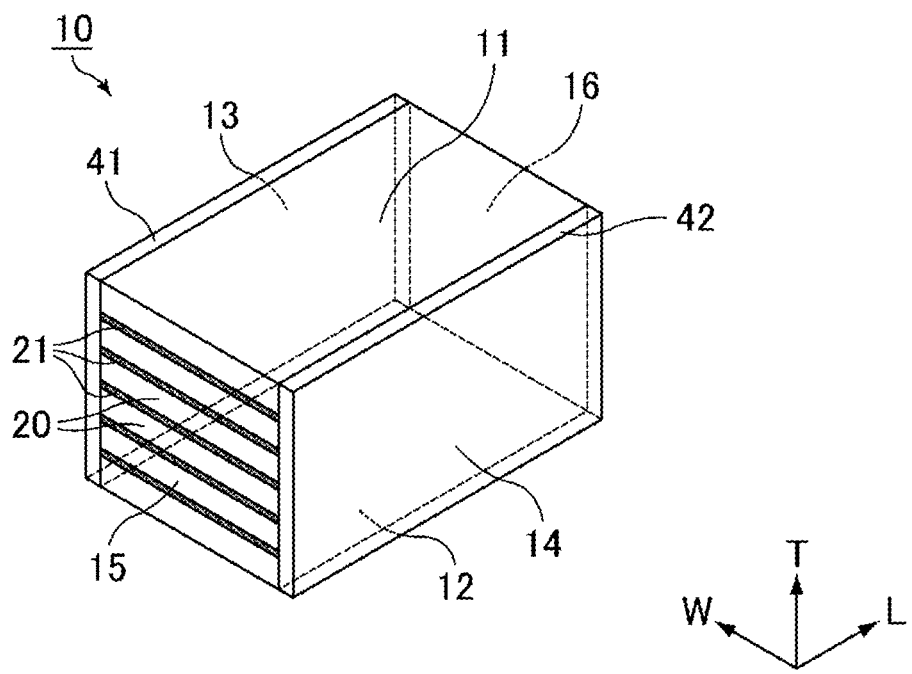
FIG. 2 is a perspective view schematically showing an example laminate defining the multilayer ceramic capacitor shown in FIG. 1.
Figure 3:
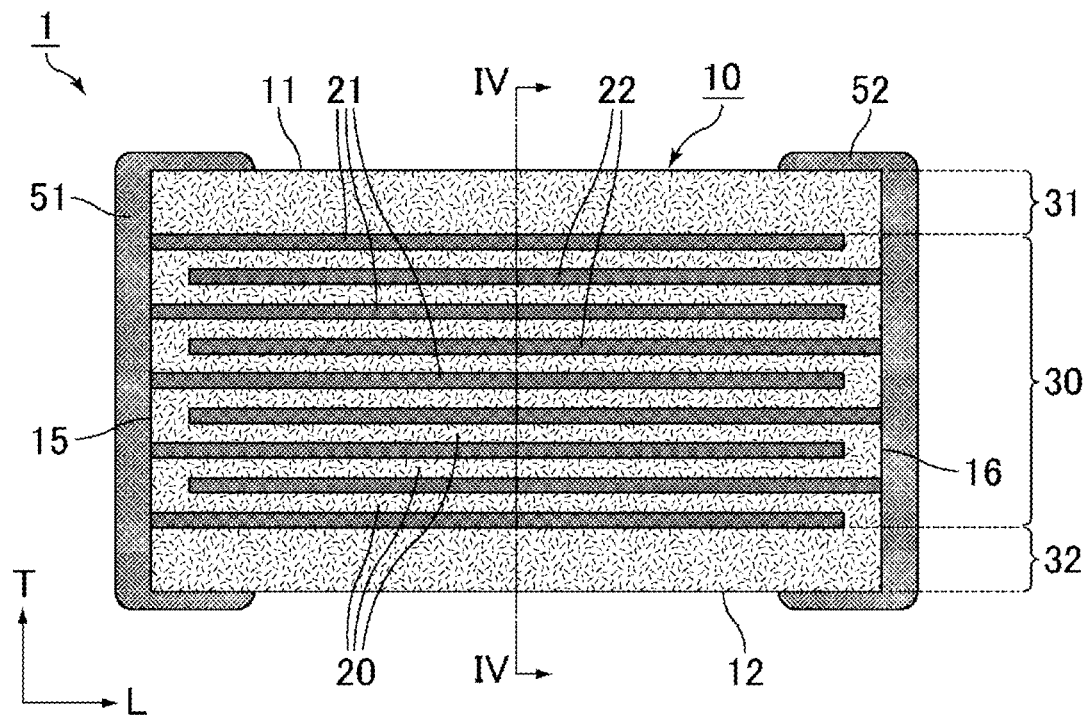
FIG. 3 is a cross-sectional view taken along the line of the multilayer ceramic capacitor shown in FIG. 1.
Figure 4:
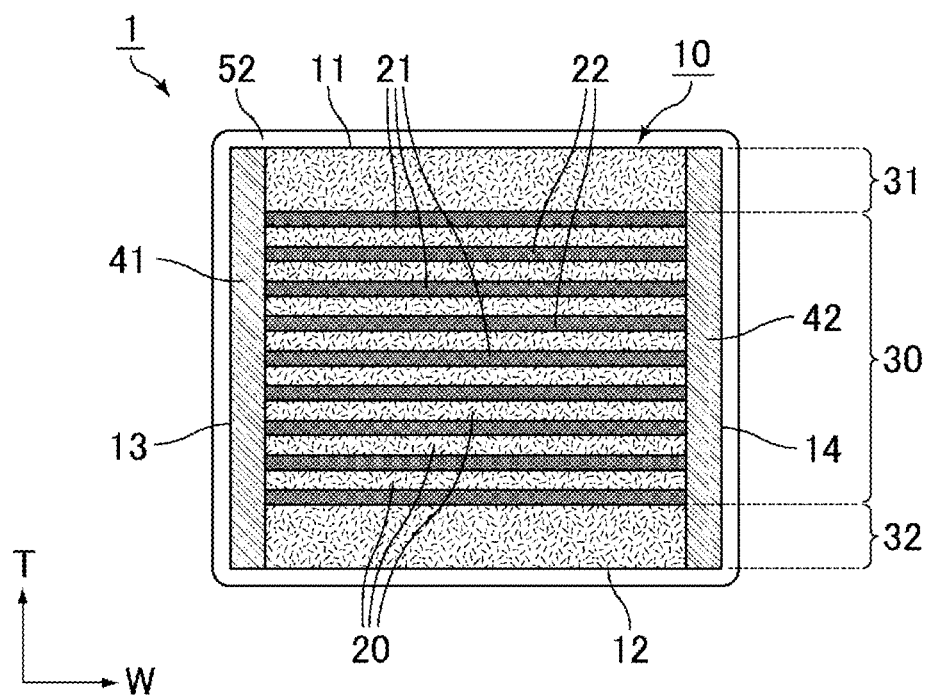
FIG. 4 is a cross-sectional view taken along the line IV-IV of the multilayer ceramic capacitor shown in FIG. 1.

FIG. 1 is a perspective view schematically showing an example multilayer ceramic capacitor according to a preferred embodiment of the present invention. FIG. 2 is a perspective view schematically showing an example laminate defining the multilayer ceramic capacitor shown in FIG. 1. FIG. 3 is a cross-sectional view taken along the line of the multilayer ceramic capacitor shown in FIG. 1. FIG. 4 is a cross-sectional view taken along the line IV-IV of the multilayer ceramic capacitor shown in FIG. 1.

Herein, a lamination direction, a width direction, and a length direction of a multilayer ceramic capacitor and a laminate indicate direction specified by arrows T, W, and L, respectively, in a multilayer ceramic capacitor 1 shown in FIG. 1 and a laminate 10 shown in FIG. 2. Here, the lamination direction, the width direction, and the length direction are perpendicular or substantially perpendicular to each other. The lamination direction is a direction in which multiple dielectric layers 20 and multiple pairs of first internal electrode layers 21 and second internal electrode layers 22 are stacked.

The multilayer ceramic capacitor 1 shown in FIG. 1 includes the laminate 10, a first external electrode 51 on one end surface of the laminate 10, and a second external electrode 52 on the other end surface of the laminate 10 of the laminate 10.

As shown in FIG. 2, the laminate 10 has a cuboid or substantially cuboid shape, and includes a first main surface 11 and a second main surface 12 that oppose each other in the lamination direction, a first side surface 13 and a second side surface 14 that oppose each other in the width direction perpendicular or substantially perpendicular to the lamination direction, and a first end surface 15 and a second end surface 16 that oppose each other in the length direction perpendicular or substantially perpendicular to the lamination direction and the width direction.

Herein, a cross section of the multilayer ceramic capacitor 1 or the laminate 10 which is perpendicular or substantially perpendicular to the first end surface 15 and the second end surface 16 and parallel or substantially parallel to the lamination direction is referred to as an LT cross section that is a cross section in the length direction and the lamination direction. A cross section of the multilayer ceramic capacitor 1 or the laminate 10 which is perpendicular or substantially perpendicular to the first side surface 13 and the second side surface 14 and parallel or substantially parallel to the lamination direction is referred to as a WT cross section that is a cross section in the width direction and the lamination direction. A cross section of the multilayer ceramic capacitor 1 or the laminate 10 which is perpendicular or substantially perpendicular to the first side surface 13, the second side surface 14, the first end surface 15, and the second end surface 16, and also perpendicular or substantially perpendicular to the lamination direction is referred to as an LW cross section that is a cross section in the length direction and the width direction. Thus, FIG. 3 shows an LT cross section of the multilayer ceramic capacitor 1, and FIG. 4 shows a WT cross section of the multilayer ceramic capacitor 1.

Preferably, corners and ridges of the laminate 10 are rounded. The corner is a portion where three surfaces of the ceramic body meet, and the ridge is a portion where two surfaces of the ceramic body meet.

As shown in FIG. 2, FIG. 3, and FIG. 4, the laminate 10 has a laminated structure including the multiple dielectric layers 20 laminated in the lamination direction, and the multiple pairs of the first internal electrode layers 21 and the second internal electrode layers 22 each along the interface between the dielectric layers 20. The dielectric layers 20 extend in the width direction and the length direction, and the first internal electrode layers 21 and the second internal electrode layers 22 each flatly extend along the dielectric layer 20.

The first internal electrode layers 21 are led out to the first end surface 15 of the laminate 10. The second internal electrode layers 22 are led out to the second end surface 16 of the laminate 10.

Each first internal electrode layer 21 and each second internal electrode layer 22 oppose each other with the dielectric layer 20 therebetween in the lamination direction. Capacitance is generated from each portion where the first internal electrode layer 21 and the second internal electrode layer 22 oppose each other with the dielectric layer 20 therebetween.

Preferably, the first internal electrode layers 21 and the second internal electrode layers 22 each include one or more metals such as Ni, Cu, Ag, Pd, Ag—Pd alloy, and Au, for example. In addition to the one or more metals, the first internal electrode layers 21 and the second internal electrode layers 22 may each include the same dielectric ceramic material as that of the dielectric layers 20.

The first external electrode 51 is on the first end surface 15 of the laminate 10. In FIG. 1, the first external electrode 51 includes portions that partially overlap the first main surface 11, the second main surface 12, the first side surface 13, and the second side surface 14. The first external electrode 51 is connected to the first internal electrode layers 21 on the first end surface 15.

The second external electrode 52 is on the second end surface 16 of the laminate 10. In FIG. 1, the second external electrode 52 includes portions that partially overlap the first main surface 11, the second main surface 12, the first side surface 13, and the second side surface 14. The second external electrode 52 is connected to the second internal electrode layers 22 on the second end surface 16.

The first external electrode 51 and the second external electrode 52 may each have a three-layered structure including, in the order from one end surface of the laminate 10, a Cu-containing base electrode layer formed by baking, a first plating layer on the surface of the base electrode layer, and a second plating layer on the surface of the first plating layer.

As shown in FIG. 3 and FIG. 4, the laminate 10 includes an inner layer portion 30 where each first internal electrode layer 21 and each second internal electrode layer 22 oppose each other with the dielectric layer 20 therebetween, a first outer layer portion 31 between the first main surface 11 and the inner layer portion 30, a second outer layer portion 32 between the second main surface 12 and the inner layer portion 30, a first side margin 41 between the first side surface 13 and the inner layer portion 30, the first side margin 41 extending between the first outer layer portion 31 and the second outer layer portion 32, and a second side margin 42 between the second side surface 14 and the inner layer portion 30, the second side margin 42 extending between the first outer layer portion 31 and the second outer layer portion 32. In FIG. 3 and FIG. 4, the inner layer portion 30 is a region sandwiched between the first internal electrode layer 21 closest to the first main surface 11 and the first internal electrode layer closest to the second main surface 12 in the lamination direction. Although not shown, preferably, the first outer layer portion 31 and the second outer layer portion 32 are each defined by the multiple dielectric layers 20 laminated in the lamination direction.

For the sake of description, FIG. 1, FIG. 2, and FIG. 4 each show a clear boundary between the laminate 10 and the first side margin 41 and a clear boundary between the laminate 10 and the second side margin 42. Yet, these boundaries may not necessarily be clear.

The dielectric layers 20 defining the inner layer portion 30 are preferably made of a dielectric ceramic material mainly containing a perovskite compound containing Ba and Ti, for example.

The dielectric layers 20 defining the first outer layer portion 31 and the second outer layer portion 32 are preferably made of a dielectric ceramic material mainly containing a perovskite compound containing Ba and Ti, for example. Preferably, the dielectric layers 20 defining the first outer layer portion 31 and the second outer layer portion 32 are made of the same dielectric ceramic material as that of the dielectric layers 20 defining the inner layer portion 30, but may be made of a dielectric ceramic material different from that of the dielectric layers 20 defining the inner layer portion 30.

The first outer layer portion 31 and the second outer layer portion 32 each preferably have a thickness of about 15 µm or more and about 40 µm or less, for example. The first outer layer portion 31 and the second outer layer portion 32 may each have a multilayer structure or a single-layer structure.

The first side margin 41 and the second side margin 42 are preferably made of a dielectric ceramic material mainly containing a perovskite compound containing Ba and Ti, for example. Preferably, the first side margin 41 and the second side margin 42 are made of the same dielectric ceramic material as that of the dielectric layers 20 defining the inner layer portion 30, the first outer layer portion 31, and the second outer layer portion 32, but may be made of a dielectric ceramic material different from that of the dielectric layers 20 defining the inner layer portion 30, the first outer layer portion 31, and the second outer layer portion 32.

The first side margin 41 and the second side margin 42 may each include multiple ceramic layers laminated in the width direction. The number of ceramic layers may be different between the first side margin 41 and the second side margin 42.

When the first side margin 41 or the second side margin 42 has a multilayer structure, observation of these side margins by dark-field observation under an optical microscope can confirm that the structure is indeed a multilayer structure because these side margins have different sinterability.

The first side margin 41 and the second side margin 42 each preferably have a thickness of about 5 µm or more and about 40 µm or less, and more preferably about 5 µm or more and about 20 µm or less, for example. Preferably, the first side margin 41 and the second side margin 42 have the same or substantially the same thickness.

The thickness of the side margin is an average of measurements of the thickness of the side margin at multiple sites in the lamination direction.

Specifically, a WT cross section is exposed at a substantially center in the length direction of the multilayer ceramic capacitor or the laminate, and is photographed using an optical microscope or an electronic microscope such that the ends of the first and second internal electrode layers in the width direction in the WT cross section and one of the side margins are in the same field of view. Three sites are photographed which include an upper portion, a central portion, and a lower portion in the lamination direction. In the upper portion, the central portion, and the lower portion, multiple segments parallel or substantially parallel to the width direction are drawn from the widthwise ends of the first and second internal electrode layers toward the side surface of the laminate, and the length of each segment is measured. The average length of the segments measured is calculated for each of the upper portion, the central portion, and the lower portion. These average lengths are further averaged, such that the thickness of the side margin is determined.

Figure 5:
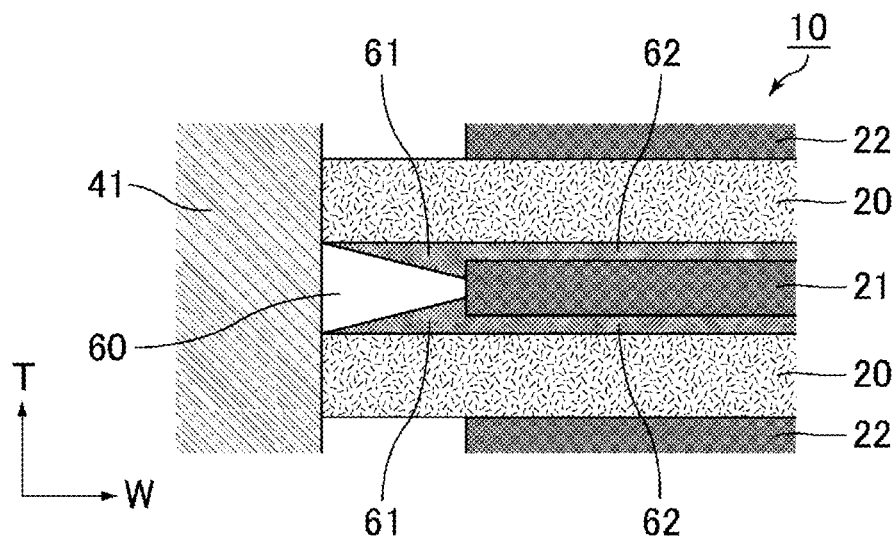
FIG. 5 is an expanded sectional view schematically showing an example connection portion between a side margin and an internal electrode layer.

FIG. 5 is an expanded sectional view schematically showing an example connection portion between the side margin and the internal electrode layer.

As shown in FIG. 5, barriers 61 are provided that each have a thickness that decreases from a widthwise end of the internal electrode layer 21 toward the first side margin 41 in the width direction, and a void is a region surrounded by the widthwise end of the internal electrode layer 21, the barriers 61, and the first side margin 41. In FIG. 5, the barriers 61 are separately provided on the upper dielectric layer 20 and the lower dielectric layer 20.

Figure 6:
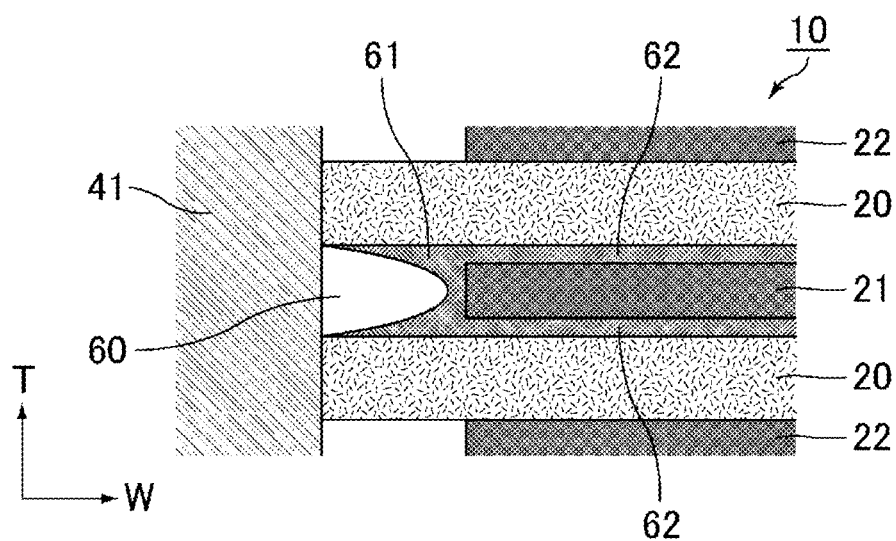
FIG. 6 is an expanded sectional view schematically showing another example connection portion between the side margin and the internal electrode layer.

FIG. 6 is an expanded sectional view schematically showing another example of the connection portion between the side margin and the internal electrode layer.

As shown in FIG. 6, the barriers 61 may be integrated with the upper dielectric layer 20 and the lower the dielectric layer 20.

FIG. 5 and FIG. 6 show examples in which the void 60 and the barriers 61 are provided between the first internal electrode layer 21 and the first side margin 41. The void 60 and the barriers 61 may be provided between the second internal electrode layer 22 and the first side margin 41. Alternatively, the void 60 and the barriers 61 may be provided between the first internal electrode layer 21 and the second side margin 42 or between the second internal electrode layer 22 and the second side margin 42. Still alternatively, the void 60 may be provided without the barriers 61 between the first internal electrode layer 21 and the first side margin 41, between the second internal electrode layer 22 and the first side margin 41, between the first internal electrode layer 21 and the second side margin 42, or between the second internal electrode layer 22 and the second side margin 42.

The barriers 61 preferably contain Ni and Sn, for example. Providing the barriers 61 containing Ni and Sn improves the insulation between the internal electrode layer 21 and the side margin 41 or 42, or between the internal electrode layer 22 and the side margin 41 or 42. This can consequently increase the reliability during voltage application.

The reliability herein can be determined, for example, by whether or not the insulation resistance is reduced by application of a rated voltage to the multilayer ceramic capacitor at a temperature of about 40° C. and a humidity of about 95% for about 500 hours. Specifically, when the insulation resistance is lower than about 1Ω·F, it is determined that a decrease in moisture resistance has occurred.

In the multilayer ceramic capacitor 1, the barriers 61 may have any suitable shape, and the barriers 61 having various shapes may be co-present. As shown in FIG. 5 and FIG. 6, preferably, the barriers 61 are provided on the upper dielectric layer 20 and the lower dielectric layer 20, but the barriers 61 may be provided only on the upper dielectric layer 20 or only on the lower dielectric layer 20. An end portion of each barrier 61 may not necessarily extend to the first side margin 41 or the second side margin 42.

In a cross section (WT cross section) in the lamination direction and the width direction of the laminate 10 at a central portion in the length direction of the laminate 10, preferably, the number in percentage of the internal electrode layers 21 and 22 each including the void 60 is, for example, about 20% or more and about 90% or less relative to the total number of the internal electrode layers 21 and 22. When the number in percentage of the internal electrode layers 21 and 22 each including the void 60 is in the above range, it results in a sufficient effect of improving the insulation between the internal electrode layer 21 or 22 and the side margin 41 or 42.

Preferably, the density of Sn in the barrier 61 decreases from a widthwise end of the first internal electrode layer 21 toward the first side margin 41. Similarly, preferably, the density of Sn in the barrier 61 decreases from a widthwise end of the second internal electrode layer 22 toward the second side margin 42. The density of Sn in the barrier 61 is higher at a portion closer to the widthwise end of the internal electrode layer 21 or 22. This can increase the reliability of the multilayer ceramic capacitor 1.

The densities of Ni and Sn in the barrier 61 can be measured by the following non-limiting example of a method.

At a position about a half in the length direction of a WT cross section of the multilayer ceramic capacitor or the laminate after firing, three regions including a central region in the lamination direction, a region closer to the upper outer layer portion (an upper region), and a region closer to the lower outer layer portion (a lower region) are defined in an area where the internal electrode layers are laminated. Portions each including the widthwise ends of the internal electrode layers and the barriers in the three regions are processed by the microsampling method with focused ion beam (FIB) to produce flake samples for analysis. Each sample for analysis is processed to have a thickness of, for example, about 60 nm or less. A damaged layer in a sample surface which was formed during the FIB process is removed by Ar ion milling, for example. SMI 3050SE (Seiko Instruments Inc.) is used for FIB, and PIPS (Gatan, Inc.) is used for Ar ion milling to process the samples for analysis.

The samples for analysis produced above were observed with a scanning transmission electron microscope (STEM), and 10 different barriers are selected from each of the three regions in the samples. These barriers are analyzed in the width direction.

A STEM in STEM analysis is JEM-2200FS (JEOL). The acceleration voltage is about 200 kV. A detector is a JED-2300T SDD with a detection area of about 60 mm$^2$. An EDX system is Noran System 7 (Thermo Fisher Scientific).

Ni and Sn in the 10 barriers in the three regions including the upper region, the central region, and the lower region, i.e., a total of 30 points, are quantitatively analyzed using an energy dispersive X-ray analyzer (EDX). The measurement probe diameter for an electron beam is about 1 nm, and the measurement time is about 30 seconds. Quantitative correction from the obtained EDX spectrum is performed using Cliff-Lorimer correction. The mapping time is three hours.

In a cross section (WT cross section) in the lamination direction and the width direction of the laminate 10 at a central portion in the length direction of the laminate 10, preferably, a mole ratio of Mg to Ti in the dielectric layer 20 opposing the internal electrode layer 21 or 22 is higher in a portion thereof corresponding to the widthwise end of the internal electrode layer 21 or 22 than in a widthwise central portion thereof. Mg in the side margin 41 or 42 is supplied to the dielectric layers 20 defining the inner layer portion 30, creating a region where Mg is segregated at the widthwise end of the internal electrode layer 21 or 22. This results in a different insulating phase, which improves the insulation between the internal electrode layer 21 or 22 and the side margin 41 or 42, thus increasing the reliability of the multilayer ceramic capacitor 1.

The composition of the dielectric layers 20 can be confirmed by scraping the dielectric layers 20 from the multilayer ceramic capacitor 1 or the laminate 10 and performing quantitative analysis by inductively coupled plasma (ICP) emission spectrometry.

In a cross section (WT cross section) in the lamination direction and the width direction of the laminate 10 at a central portion in the length direction of the laminate 10, preferably, at least one of the internal electrode layers 21 and 22 has a continuity of about 90% or more, for example. The internal electrode layer 21 or 22 having a continuity of about 90% or more can increase the capacitance of the multilayer ceramic capacitor 1.

Figure 7:
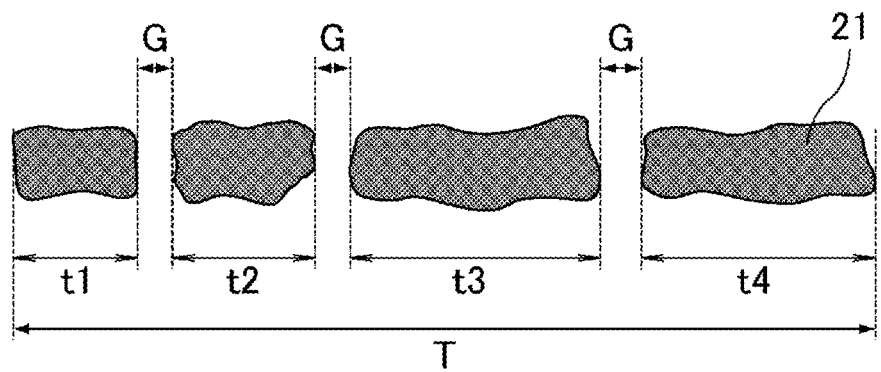
FIG. 7 is a view schematically explaining a method of quantifying the continuity of the internal electrode layer.

FIG. 7 is a view schematically explaining a non-limiting example of a method of quantifying the continuity of the internal electrode layer. FIG. 7 shows a WT cross section of the first internal electrode layer 21 at a substantially center in the length direction of the laminate 10.

As shown in FIG. 7, in the first internal electrode layer 21, the entire length of the first internal electrode layer 21 including gaps G is specified as T, and the lengths of portions where the first internal electrode layer 21 is actually formed are specified as t1, t2, t3, . . . , tn. Thus, the length of the actual first internal electrode layer 21 (t1+t2+t3+ . . . +tn) can be measured by subtracting the lengths of the gaps G from the entire length T of the first internal electrode layer 21. The length of the barriers 61 is not included. Here, the continuity of the first internal electrode layer 21 can be determined as follows: (t1+t2+t3+ . . . +tn)/T. FIG. 7 only shows four portions (t1, t2, t3, and t4) where the first internal electrode layer 21 is actually formed in one first internal electrode layer 21, but the number of portions where the first internal electrode layer 21 is actually formed is not limited. The same applies to the second internal electrode layer 22.

The measurement site is preferably a central portion in the WT cross section. A region covering, for example, about 30 μm×about 30 μm from the central portion is photographed, and the first internal electrode layer 21 or the second internal electrode layer 22 located at the center or approximate center of the region is measured.

When the first internal electrode layers 21 contain Ni, preferably, Ni—Sn reaction layers 62 are formed at the interfaces between the first internal electrode layers 21 and the dielectric layers 20; each Ni—Sn reaction layer 62 is continuously formed in a linear shape with a length of, for example, about 50.0% or more and about 100.0% or less of a dimension of each first internal electrode layer 21 in the width direction; and the thickness ratio of each Ni—Sn reaction layer 62 to each dielectric layer 20 is about 0.0035 or more and about 0.06 or less, for example. When the second internal electrode layers 22 contain Ni, preferably, the Ni—Sn reaction layers 62 are formed at the interfaces between the second internal electrode layers 22 and the dielectric layers 20; each Ni—Sn reaction layer 62 is continuously formed in a linear shape with a length of, for example, about 50.0% or more and about 100.0% or less of a dimension of each second internal electrode layer 22 in the width direction; and the thickness ratio of each Ni—Sn reaction layer 62 to each dielectric layer 20 is about 0.0035 or more and about 0.06 or less, for example.

The Ni—Sn reaction layers 62 formed at the interfaces between the internal electrode layers 21 or 22 and the dielectric layers 20 further improve the reliability of the multilayer ceramic capacitor 1. The advantageous effect of improving the reliability becomes weak when the length of each Ni—Sn reaction layer 62 is less than about 50.0% of the dimension of the internal electrode layer 21 or 22 in the width direction or when the thickness ratio of each Ni—Sn reaction layer 62 to each dielectric layer 20 is less than about 0.0035. The function of the multilayer ceramic capacitor 1 is impaired when the thickness ratio of each Ni—Sn reaction layer 62 to each dielectric layer 20 is more than about 0.06.

A non-limiting example of a method of quantifying the continuity and the thickness of each Ni—Sn reaction layer is described. First, the laminate is polished to expose a WT cross section of the laminate at a substantially center in the length direction. Then, the exposed WT cross section is processed into a flake by FIB. Further, at a central portion in the lamination direction of the flake WT cross section, 20 fields of view are randomly selected in the width direction and each of the selected fields of view is observed by elemental distribution mapping, using scanning transmission electron microscope-energy dispersive X-ray spectroscopy (STEM-EDS). In this manner, the continuity and the thickness of each Ni—Sn reaction layer are quantified.

In the multilayer ceramic capacitor 1, the first internal electrode layers 21 and the second internal electrode layers 22 each preferably have a thickness of about 0.4 μm or less, more preferably about 0.38 μm or less, and still more preferably about 0.25 μm or more, for example.

The thickness of each dielectric layer 20 is preferably about 0.33 μm or more and about 0.53 μm or less, for example. Herein, the thickness of each dielectric layer 20 is the thickness of each dielectric layer 20 between the internal electrode layers 21 or 22, i.e., the thickness of each the dielectric layer 20 in the inner layer portion 30.

Figure 8:
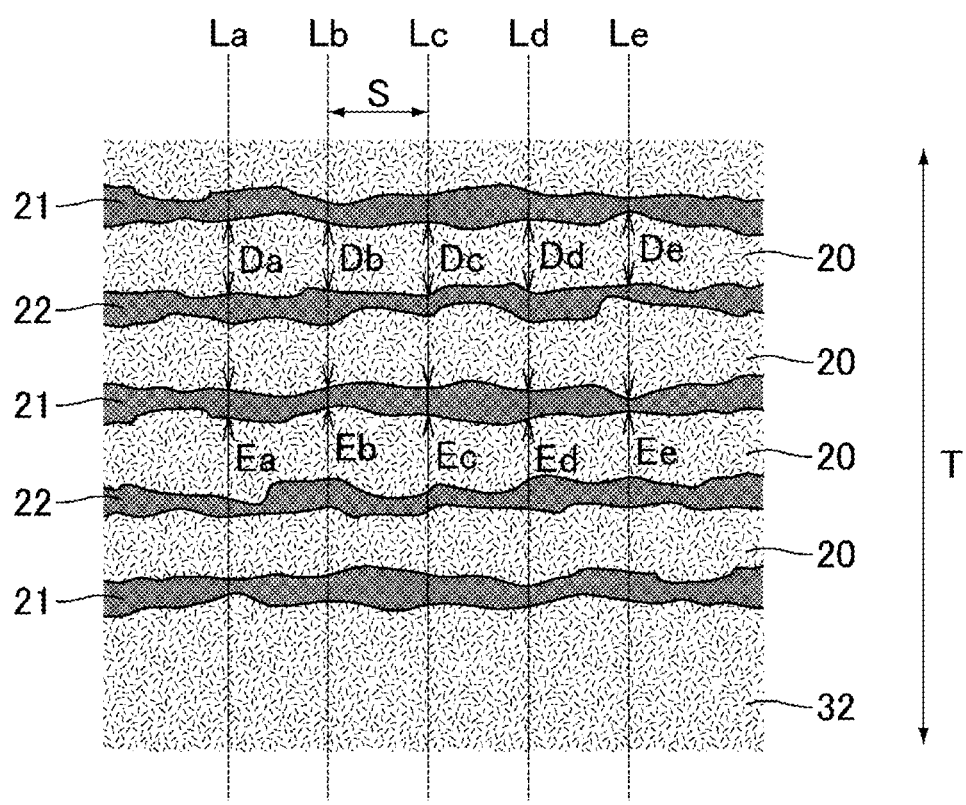
FIG. 8 is a view schematically explaining a method of quantifying the thickness of the internal electrode layer and the thickness of the dielectric layer.

FIG. 8 is a view schematically explaining a non-limiting example of a method of quantifying the thickness of the internal electrode layer and the thickness of the dielectric layer. FIG. 8 shows a portion of the WT cross section of the laminate 10 at a substantially center in the length direction.

First, the laminate is polished to expose a WT cross section of the laminate at a substantially center in the length direction. If necessary, the polished surface is etched to remove the internal electrode layers stretched by polishing. Then, the exposed WT cross section is observed by a scanning electron microscope (SEM).

A straight line Lc extending in the lamination direction of the laminate and passing through the center of the laminate is drawn. Next, multiple straight lines parallel or substantially parallel to the straight line Lc are drawn at equal or substantially equal intervals (pitch S). The pitch S may preferably be about, about 5 to 10 times the thickness of the dielectric layer or the internal electrode layer to be measured. For example, when measuring the thickness of the dielectric layer having a thickness of about 0.5 μm, the pitch S is about 2.5 μm. The same number of straight lines are drawn on both sides of the straight line Lc. In other words, an odd number of straight lines including the straight line Lc are drawn in total. FIG. 8 shows five straight lines including straight lines La to Le.

Next, the thickness of the dielectric layer and the thickness of the internal electrode layer are measured on each of the straight lines La to Le. When the dielectric layers supposed to sandwich the internal electrode layer are connected together because the internal electrode layer is missing or when an enlarged image of a measurement position is unclear on any of the straight lines La to Le, the thickness or the distance is measured on a straight line further away from the straight line Lc.

For example, when measuring the thickness of one dielectric layer, as shown in FIG. 8, a thickness Da on the straight line La, a thickness Db on the straight line Lb, a thickness Dc on the straight line Lc, a thickness Dd on the straight line Ld, and a thickness De on the straight line Le are measured, and an average of these measurements is determined as the thickness of the dielectric layer.

Similarly, when measuring the thickness of one internal electrode layer, as shown in FIG. 8, a thickness Ea on the straight line La, a thickness Eb on the straight line Lb, a thickness Ec on the straight line Lc, a thickness Ed on the straight line Ld, and a thickness Ee on the straight line Le are measured, and an average of these measurements is determined as the thickness of the internal electrode layer.

For example, when calculating the average thickness of multiple dielectric layers and the average thickness of multiple internal electrode layers, the thickness of each of five dielectric layers and the thickness of each of five internal electrode layer are measured by the method described above, and these measurements are averaged to determine the average thickness of the multiple dielectric layers and the average thickness of the multiple internal electrode layer. The five dielectric layers include one dielectric layer at a substantially center in the lamination direction and two dielectric layers on both sides thereof. The five internal electrodes include one internal electrode layer at a substantially center in the lamination direction and two internal electrode layers on both sides thereof. When there are less than five dielectric layers or there are less than five internal electrode layers, the thickness of each dielectric layer or the thickness of each internal electrode layer are measured by the method described above, and these measurements are averaged to determine the average thickness of the multiple dielectric layers and the average thickness of the multiple internal electrode layer.

Preferred dimensions of the multilayer ceramic capacitor 1 are described below. The dimensions of the multilayer ceramic capacitor 1 can be measured with a micrometer or an optical microscope, for example.

Dimension in the lamination direction: about 0.300 mm±0.090 mm

Dimension in the width direction: about 0.300 mm±0.090 mm

Dimension in the length direction: about 0.600 mm±0.090 mm

Number of the dielectric layers: 100 or more and 500 or less

Dimension in the lamination direction: about 0.200 mm±0.050 mm

Dimension in the width direction: about 0.200 mm±0.050 mm

Dimension in the length direction: about 0.400 mm±0.050 mm

Number of the dielectric layers: 50 or more and 300 or less

Dimension in the lamination direction: about 0.200 mm±0.020 mm

Dimension in the width direction: about 0.200 mm±0.020 mm

Dimension in the length direction: about 0.400 mm±0.020 mm

Number of the dielectric layers: 50 or more and 300 or less

Dimension in the lamination direction: about 0.300 mm±0.020 mm

Dimension in the width direction: about 0.200 mm±0.020 mm

Dimension in the length direction: about 0.400 mm±0.020 mm

Number of the dielectric layers: 50 or more and 300 or less

Dimension in the lamination direction: about 0.300 mm±0.050 mm

Dimension in the width direction: about 0.200 mm±0.050 mm

Dimension in the length direction: about 0.400 mm±0.050 mm

Thickness of each dielectric layer: about 0.48 μm±0.10 μm

Number of the dielectric layers: 100 or more and 500 or less

Dimension in the lamination direction: about 0.300 mm±0.050 mm

Dimension in the width direction: about 0.300 mm±0.050 mm

Dimension in the length direction: about 0.400 mm±0.050 mm

Number of the dielectric layers: 100 or more and 500 or less

Dimension in the lamination direction: about 0.250 mm±0.025 mm

Dimension in the width direction: about 0.250 mm±0.025 mm

Dimension in the length direction: about 0.500 mm±0.025 mm

Number of the dielectric layers: 100 or more and 500 or less

Dimension in the lamination direction: about 0.500 mm±0.050 mm

Dimension in the width direction: about 0.500 mm±0.050 mm

Dimension in the length direction: about 0.800 mm±0.050 mm

Thickness of each dielectric layer: about 0.48 μm±0.10 μm

Number of the dielectric layers: 200 or more and 1000 or less

Dimension in the lamination direction: about 0.600 mm±0.050 mm

Dimension in the width direction: about 0.450 mm±0.050 mm

Dimension in the length direction: about 0.750 mm±0.050 mm

Thickness of each dielectric layer: about 0.48 μm±0.10 μm

Number of the dielectric layers: 200 or more and 1000 or less

Dimension in the lamination direction: about 0.500 mm±0.200 mm

Dimension in the width direction: about 0.500 mm±0.200 mm

Dimension in the length direction: about 1.000 mm±0.200 mm

Thickness of each dielectric layer: about 0.48 μm±0.10 μm

Number of the dielectric layers: 200 or more and 1000 or less

Method of Producing Multilayer Ceramic Capacitor

Preferably, a non-limiting example of a method of producing a multilayer ceramic capacitor according to a preferred embodiment of the present invention includes preparing a green chip having a laminated structure including multiple raw dielectric layers and multiple pairs of raw internal electrode layers in which the internal electrode layers are exposed at a first side surface and a second side surface that oppose each other in a width direction perpendicular to a lamination direction, producing a raw laminate by forming a raw side margin on each of the first side surface and the second side surface of the green chip, and firing the raw laminate.

A non-limiting example of a method of producing the multilayer ceramic capacitor 1 shown in FIG. 1 is described below.

First, a ceramic green sheet that turns into the dielectric layer 20 is prepared. The ceramic green sheet contains ceramic raw materials such as the dielectric ceramic material described above and components such as a binder and a solvent. Preferably, the ceramic green sheet is substantially free of Mg. The ceramic green sheet is formed on a carrier film using a coater such as a die coater, a gravure coater, or a micro gravure coater, for example.

Figure 9A:
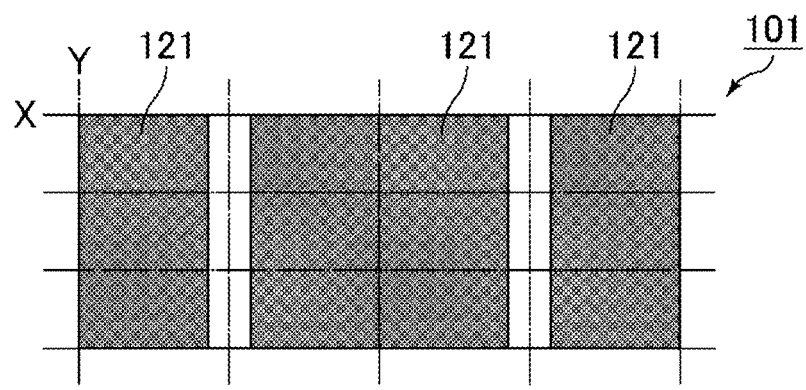
FIG. 9A to FIG. 9C are plan views each schematically showing an example ceramic green sheet.
Figure 9B:
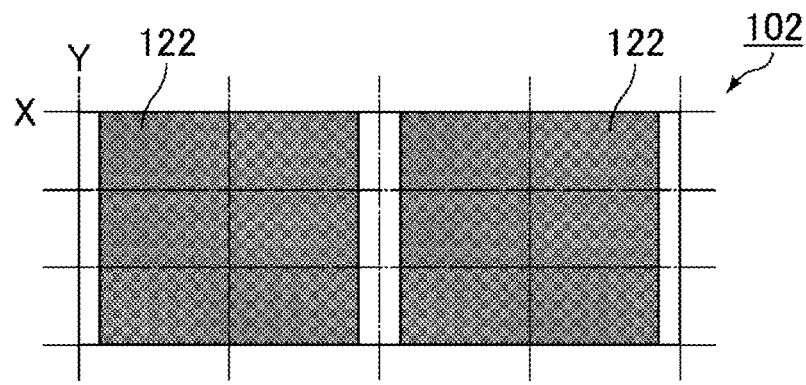
Figure 9C:
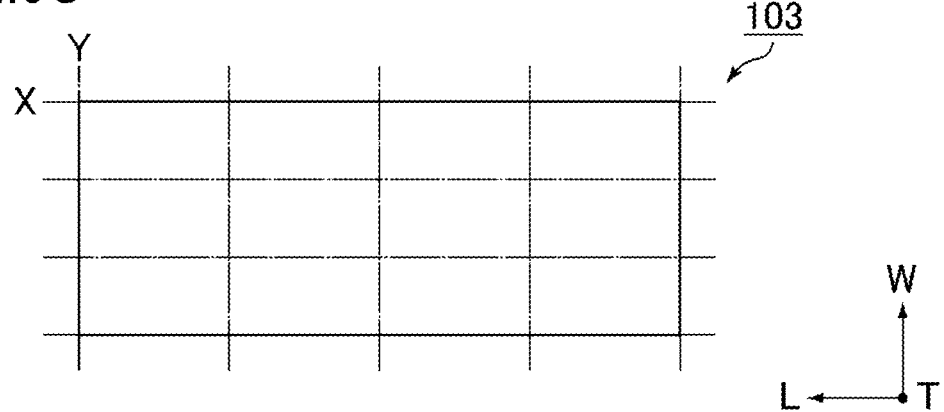

FIGS. 9A to 9C are plan views each schematically showing an example ceramic green sheet.

FIGS. 9A to 9C each show a first ceramic green sheet 101 that forms the inner layer portion 30, a second ceramic green sheet 102 that forms the inner layer portion 30, and a third ceramic green sheet 103 that forms the first outer layer portion 31 or the second outer layer portion 32.

In FIGS. 9A to 9C, the first ceramic green sheet 101, the second ceramic green sheet 102, and the third ceramic green sheet 103 are not cut into individual multilayer ceramic capacitors 1. FIGS. 9A to 9C show cutting lines X and Y along which these ceramic green sheets are cut into individual multilayer ceramic capacitors 1. The cutting lines X are parallel or substantially parallel to the length direction, and the cutting lines Y are parallel or substantially parallel to the width direction.

As shown in FIG. 9A, raw first internal electrode layers 121 corresponding to the first internal electrode layers 21 are formed on the first ceramic green sheet 101. As shown in FIG. 9B, raw second internal electrode layers 122 corresponding to the second internal electrode layers 22 are formed on the second ceramic green sheet 102. As shown in FIG. 9C, neither the raw first internal electrode layers 121 or the raw second internal electrode layer 122 are formed on the third ceramic green sheet 103 corresponding to the first outer layer portion 31 or the second outer layer portion 32.

The first internal electrode layers 121 and the second internal electrode layers 122 can be formed with a conductive paste mainly containing Ni, for example. The conductive paste further contains Sn in order to form the barriers 61 and the Ni—Sn reaction layers 62 described above. A method such as screen printing or gravure printing can be used, for example, to form the first internal electrode layers 121 and the second internal electrode layers 122 with the conductive paste.

The first internal electrode layers 121 and the second internal electrode layers 122 are each disposed over two regions adjacent to each other in the length direction divided by the cutting lines Y, and extend in a band-shaped fashion in the width direction. The first internal electrode layers 121 are shifted by one column relative to the second internal electrode layers 122 in the longitudinal direction divided by the cutting lines Y. In other words, a cutting line Y passing through the center or approximate center of each first internal electrode layer 121 passes through a region between the second internal electrode layers 122, and a cutting line Y passing through the center or approximate center of the second internal electrode layer 122 passes through a region between the first internal electrode layers 121.

Subsequently, the first ceramic green sheets 101, the second ceramic green sheets 102, and the third ceramic green sheets 103 are laminated together to produce a mother block.

FIG. 10 is an exploded perspective view schematically showing an example mother block.

For the sake of description, FIG. 10 shows an exploded view of the first ceramic green sheets 101, the second ceramic green sheets 102, and the third ceramic green sheets 103. In an actual mother block 104, the first ceramic green sheets 101, the second ceramic green sheets 102, and the third ceramic green sheets 103 are compressed and integrated together by isostatic pressing, for example.

In the mother block 104 shown in FIG. 10, the first ceramic green sheets 101 and the second ceramic green sheets 102 corresponding to the inner layer portion 30 are alternately laminated in the lamination direction. Further, the third ceramic green sheets 103 corresponding to the first outer layer portion 31 and the second outer layer portion 32 are laminated on the top and bottom surfaces in the lamination direction of the laminate of the first ceramic green sheets 101 and the second ceramic green sheets 102 which are alternately laminated. While FIG. 10 shows three third ceramic green sheets 103 laminated on each of the top and bottom surfaces, the number of the third ceramic green sheets 103 can be suitably varied.

The resulting mother block 104 is cut along the cutting lines X and Y (see FIGS. 9A to 9C), such that multiple green chips are produced. A method such as dicing, force-cutting, or laser cutting, for example, is suitably used for the cutting.

Figure 11:
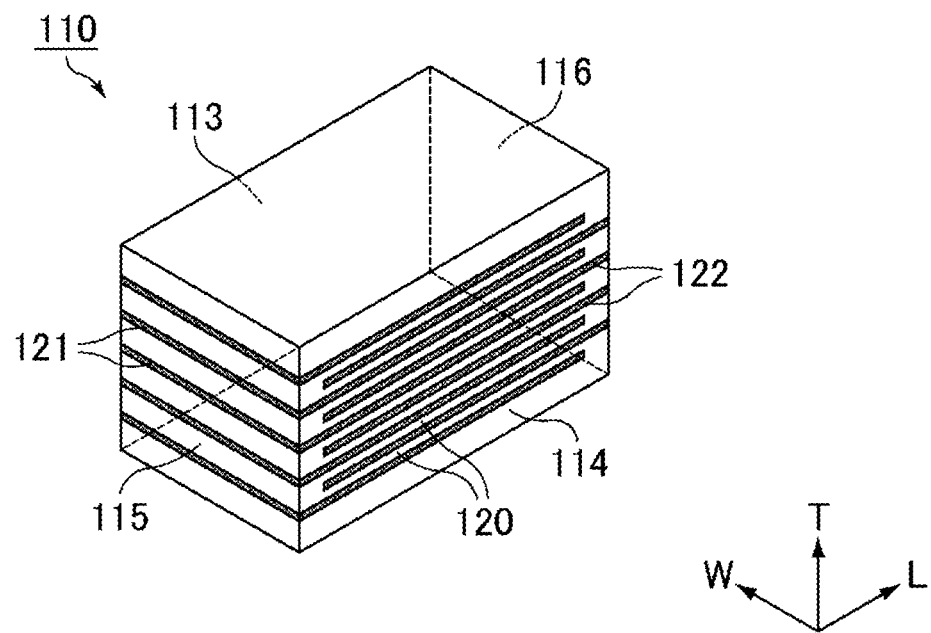
FIG. 11 is a perspective view schematically showing an example green chip.

FIG. 11 is a perspective view schematically showing an example green chip.

A green chip 110 shown in FIG. 11 has a laminated structure including multiple dielectric layers 120 and multiple pairs of the first internal electrode layers 121 and the second internal electrode layers 122 in a raw state. A first side surface 113 and a second side surface 114 of the green chip 110 are surfaces that result from cutting along a cutting line X, and a first end surface 115 and a second end surface 116 are surfaces that result from cutting along a cutting line Y. The first internal electrode layers 121 and the second internal electrode layers 122 are exposed on the first side surface 113 and the second side surface 114. Only the first internal electrode layers 121 are exposed on the first end surface 115, and only the second internal electrode layers 122 are exposed on the second end surface 116.

Raw side margins are formed on the first side surface 113 and the second side surface 114 of the green chip 110, such that a raw laminate is produced. The raw side margins are formed, for example, by bonding side margin ceramic green sheets to the first side surface and the second side surface of the green chip.

A side margin ceramic slurry is produced which preferably contains, for example, ceramic raw materials that include a dielectric ceramic material mainly containing a perovskite compound containing Ba and Ti, and components such as a binder and a solvent. Preferably, the side margin ceramic slurry contains Mg, for example.

The side margin ceramic slurry is applied to the surface of a resin film and dried, such that a side margin ceramic green sheet is formed. Then, the side margin ceramic green sheet is separated from the resin film.

Subsequently, the side margin ceramic green sheet is placed to oppose the first side surface 113 of the green chip 110, and press-punched, for example, such that the raw first side margin 41 is formed. Further, the side margin ceramic green sheet is placed to oppose the second side surface 114 of the green chip 110, and press-punched, such that the raw second side margin 42 is formed. Here, an organic solvent that defines and functions as an adhesive is preferably applied to the side surface of the green chip in advance. Thus, a raw laminate is obtained.

Figure 12:
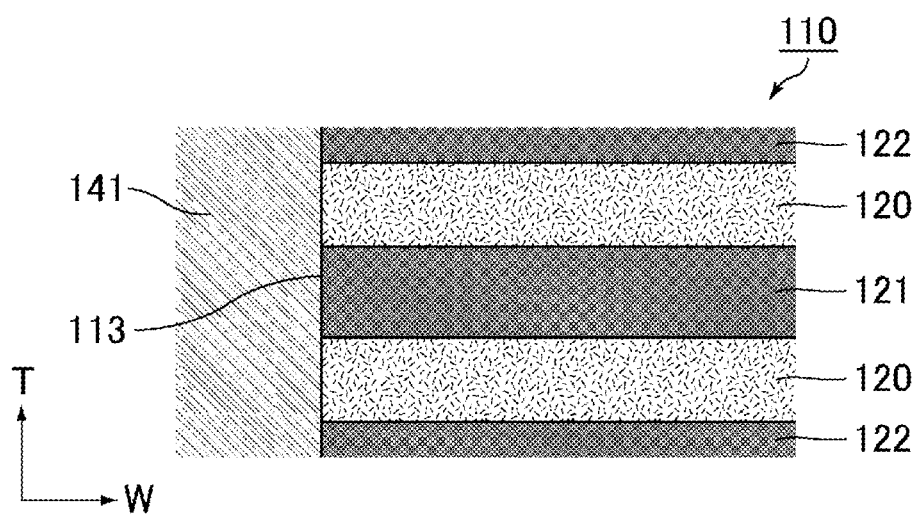
FIG. 12 is an expanded sectional view schematically showing an example green chip including a raw side margin.

FIG. 12 is an expanded sectional view schematically showing an example green chip including a raw side margin.

In FIG. 12, a raw first side margin 141 is formed on the first side surface 113 of the green chip 110. As shown in FIG. 12, on the first side surface 113 of the green chip 110, the end surface of each of the raw first internal electrode layers 121 and the raw second internal electrode layers 122 is preferably aligned with the end surface of each raw dielectric layer 120, but may be located more inward than the end surface of each raw dielectric layer 120 in the width direction.

Although not shown, a raw second side margin 142 is formed on the second side surface 114 of the green chip 110. On the second side surface 114 of the green chip 110, the end surface of each of the raw first internal electrode layers 121 and the raw second internal electrode layers 122 is preferably aligned with the end surface of each raw dielectric layer 120, but may be located more inward than the end surface of each raw dielectric layer 120 in the width direction.

Preferably, the raw laminate obtained by the above method is subjected to barrel polishing, for example. Polishing the raw laminate results in rounded corners and ridges of the laminate 10 after firing.

The raw laminate is degreased under predetermined conditions, in a nitrogen atmosphere, for example, and then fired at a predetermined temperature, in a mixture atmosphere of nitrogen, hydrogen, and steam, for example. Thus, the sintered laminate 10 (see FIG. 2) is obtained.

Since the shrinkage rate of the dielectric layers 20 is different from that of the first internal electrode layers 21 and the second internal electrode layers 22, the void 60 shown in FIG. 5 is produced in at least one of the following regions: between the widthwise end of the first internal electrode layer 21 and the first side margin 41; between the widthwise end of the second internal electrode layer 22 and the first side margin 41; between the widthwise end of the first internal electrode layer 21 and the second side margin 42;

and between the widthwise end of the second internal electrode layer 22 and the second side margin 42.

Further, since Sn in the conductive paste is solid-dissolved in Ni, the barrier 61 shown in FIG. 5 are formed in at least one of the followings regions: between the widthwise end of the first internal electrode layer 21 and the first side margin 41; between the widthwise end of the second internal electrode layer 22 and the first side margin 41; between the widthwise end of the first internal electrode layer 21 and the second side margin 42; and between the widthwise end of the second internal electrode layer 22 and the second side margin 42.

As shown in FIG. 5, each Ni—Sn reaction layer 62 may be formed on the interface between the first internal electrode layer 21 or the second internal electrode layer 22 and the dielectric layer 20.

The first external electrode 51 and the second external electrode 52 are formed on the first end surface 15 and the second end surface 16, respectively, of the resulting laminate 10. Thus, the multilayer ceramic capacitor 1 is produced.

The raw side margins may be formed by bonding the side margin ceramic green sheets to both side surfaces of the green chip or by applying the side margin ceramic slurry to both side surfaces of the green chip, for example.

When the raw side margins are formed by applying the side margin ceramic slurry, the side margin ceramic slurry is applied to both side surfaces of the green chip, and dried.

Alternatively, the raw side margins may be formed by, for example, masking both end surfaces of the green chip with resin or the like and dipping the green chip entirely into the side margin ceramic slurry.

In the above preferred embodiment, the mother block 104 is cut along the cutting lines X and Y to produce multiple green chips, and the raw side margin is formed on each side surface of the green chip. Yet, the above preferred embodiment may be modified.

Specifically, the mother block may be cut only along the cutting lines X to produce multiple rod-shaped green blocks in which the first internal electrode layers and the second internal electrode layers are exposed to side surfaces that result from the cutting along the cutting lines X. Then, the raw side margins are formed on the side surfaces of each green block, and the green blocks are cut along the cutting lines Y to produce multiple raw laminates, followed by firing of the raw laminates. After firing, the same steps as in the preferred embodiment described above are performed, such that multilayer ceramic capacitors can be produced.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a laminate including a plurality of dielectric layers and a plurality of internal electrode layers laminated together in a lamination direction, a first main surface and a second main surface that oppose each other in the lamination direction, a first side surface and a second side surface that oppose each other in a width direction perpendicular or substantially perpendicular to the lamination direction, and a first end surface and a second end surface that oppose each other in a length direction perpendicular or substantially perpendicular to the lamination direction and the width direction; and a pair of external electrodes include one on the first end surface and another on the second end surface, the external electrodes being connected to the internal electrode layers; wherein
the laminate includes an inner layer portion where the plurality of internal electrode layers oppose each other with a dielectric layer of the plurality of dielectric layers therebetween, a first outer layer portion between the first main surface and the inner layer portion, a second outer layer portion between the second main surface and the inner layer portion, a first side margin between the first side surface and the inner layer portion, the first side margin extending between the first outer layer portion and the second outer layer portion, and a second side margin between the second side surface and the inner layer portion, the second side margin extending between the first outer layer portion and the second outer layer portion;
a barrier is provided on a widthwise end of at least one of the plurality of internal electrode layers, the barrier having a thickness that decreases from the widthwise end of the at least one of the plurality of internal electrode layers toward the first side margin or the second side margin in the width direction;
a void is defined by the widthwise end of the internal electrode layer, the barrier, and the first side margin or the second side margin; and
the barrier contains Ni and Sn.

2. The multilayer ceramic capacitor according to claim 1, wherein in a cross section in the lamination direction and the width direction of the laminate at a central portion in the length direction of the laminate, a number in percentage of internal electrode layers of the plurality of internal electrode layers each including the void is about 20% or more and about 90% or less relative to a total number of the plurality of internal electrode layers.

3. The multilayer ceramic capacitor according to claim 1, wherein a density of Sn in the barrier decreases from the widthwise end of the at least one of the plurality of internal electrode layers toward the first side margin or the second side margin.

4. The multilayer ceramic capacitor according to claim 1, wherein in a cross section in the lamination direction and the width direction of the laminate at a central portion in the length direction of the laminate, a mole ratio of Mg to Ti in a dielectric layer of the plurality of dielectric layers opposing the at least one of the plurality of internal electrode layers is higher in a portion thereof corresponding to the widthwise end of the at least one of the plurality of internal electrode layers than in a widthwise central portion thereof.

5. The multilayer ceramic capacitor according to claim 1, wherein in a cross section in the lamination direction and the width direction of the laminate at a central portion in the length direction of the laminate, at least one of the plurality of internal electrode layers has a continuity of about 90% or higher.

6. The multilayer ceramic capacitor according to claim 1, wherein
the at least one of the plurality of internal electrode layers contains Ni;
a Ni—Sn reaction layer is provided on an interface between the at least one of the plurality of internal electrode layers and an opposing dielectric layer of the plurality of dielectric layers;
the Ni—Sn reaction layer is continuously provided in a linear shape with a length of about 50.0% or more and about 100.0% or less of a dimension of the at least one of the plurality of internal electrode layers in the width direction; and a thickness ratio of the Ni—Sn reaction layer to the opposing dielectric layer is about 0.0035 or more and about 0.06 or less.

7. The multilayer ceramic capacitor according to claim 1, wherein a thickness of each of the plurality of dielectric layers is about 0.33 μm or more and about 0.53 μm or less.

8. The multilayer ceramic capacitor according to claim 1, wherein
a dimension of the multilayer ceramic capacitor in the lamination direction is about 0.300 mm±0.090 mm;
a dimension of the multilayer ceramic capacitor in the width direction is about 0.300 mm±0.090 mm;
a dimension of the multilayer ceramic capacitor in the length direction is about 0.600 mm±0.090 mm; and
a number of the plurality of dielectric layers is 100 or more and 500 or less.

9. The multilayer ceramic capacitor according to claim 1, wherein
a dimension of the multilayer ceramic capacitor in the lamination direction is about 0.200 mm±about 0.050 mm;
a dimension of the multilayer ceramic capacitor in the width direction is about 0.200 mm±0.050 mm;
a dimension of the multilayer ceramic capacitor in the length direction is about 0.400 mm±0.050 mm; and
a number of the plurality of dielectric layers is 50 or more and 300 or less.

10. The multilayer ceramic capacitor according to claim 1, wherein
a dimension of the multilayer ceramic capacitor in the lamination direction is about 0.200 mm±0.020 mm;
a dimension of the multilayer ceramic capacitor in the width direction is about 0.200 mm±0.020 mm;
a dimension of the multilayer ceramic capacitor in the length direction is about 0.400 mm±0.020 mm; and
a number of the plurality of dielectric layers is 50 or more and 300 or less.

11. The multilayer ceramic capacitor according to claim 1, wherein
a dimension of the multilayer ceramic capacitor in the lamination direction is about 0.300 mm±0.020 mm;
a dimension of the multilayer ceramic capacitor in the width direction is about 0.200 mm±0.020 mm;
a dimension of the multilayer ceramic capacitor in the length direction is about 0.400 mm±0.020 mm,
a number of the plurality of dielectric layers is 50 or more and 300 or less.

12. The multilayer ceramic capacitor according to claim 1, wherein
a dimension of the multilayer ceramic capacitor in the lamination direction is about 0.300 mm±0.050 mm;
a dimension of the multilayer ceramic capacitor in the width direction is about 0.200 mm±0.050 mm;
a dimension of the multilayer ceramic capacitor in the length direction is about 0.400 mm±0.050 mm;
a thickness of each of the plurality of dielectric layers is about 0.48 μm±0.10 μm; and
a number of the plurality of dielectric layers is 100 or more and 500 or less.

13. The multilayer ceramic capacitor according to claim 1, wherein
a dimension of the multilayer ceramic capacitor in the lamination direction is about 0.300 mm±0.050 mm;
a dimension of the multilayer ceramic capacitor in the width direction is about 0.300 mm±0.050 mm;
a dimension of the multilayer ceramic capacitor in the length direction is about 0.400 mm±0.050 mm,
a number of the plurality of dielectric layers is 100 or more and 500 or less.

14. The multilayer ceramic capacitor according to claim 1, wherein
a dimension of the multilayer ceramic capacitor in the lamination direction is about 0.250 mm±0.025 mm;
a dimension of the multilayer ceramic capacitor in the width direction is about 0.250 mm±0.025 mm;
a dimension of the multilayer ceramic capacitor in the length direction is about 0.500 mm±0.025 mm; and
a number of the plurality of dielectric layers is 100 or more and 500 or less.

15. The multilayer ceramic capacitor according to claim 1, wherein
a dimension of the multilayer ceramic capacitor in the lamination direction is about 0.500 mm±0.050 mm;
a dimension of the multilayer ceramic capacitor in the width direction is about 0.500 mm±0.050 mm;
a dimension of the multilayer ceramic capacitor in the length direction is about 0.800 mm±0.050 mm;
a thickness of each of the plurality of dielectric layers is about 0.48 μm±0.10 μm; and
a number of the plurality of dielectric layers is 200 or more and 1000 or less.

16. The multilayer ceramic capacitor according to claim 1, wherein
a dimension of the multilayer ceramic capacitor in the lamination direction is about 0.600 mm±0.050 mm;
a dimension of the multilayer ceramic capacitor in the width direction is about 0.450 mm±0.050 mm;
a dimension of the multilayer ceramic capacitor in the length direction is about 0.750 mm±0.050 mm;
a thickness of each of the plurality of dielectric layers is about 0.48 μm±0.10 μm; and
a number of the plurality of dielectric layers is 200 or more and 1000 or less.

17. The multilayer ceramic capacitor according to claim 1, wherein
a dimension of the multilayer ceramic capacitor in the lamination direction is about 0.500 mm±0.200 mm;
a dimension of the multilayer ceramic capacitor in the width direction is about 0.500 mm±0.200 mm;
a dimension of the multilayer ceramic capacitor in the length direction is about 1.000 mm±0.200 mm;
a thickness of each of the plurality of dielectric layers is about 0.48 μm±0.10 μm; and
a number of the plurality of dielectric layers is 200 or more and 1000 or less.

18. The multilayer ceramic capacitor according to claim 1, wherein corners and ridges of the laminate are rounded.

19. The multilayer ceramic capacitor according to claim 1, wherein each of the plurality of internal electrode layers includes one or more of Ni, Cu, Ag, Pd, Ag—Pd alloy, and Au.

20. The multilayer ceramic capacitor according to claim 1, wherein each of the plurality of dielectric layers are made of a dielectric ceramic material mainly containing a perovskite compound containing Ba and Ti.

* * * * *